United States Patent
Sato et al.

(10) Patent No.: US 9,638,785 B2
(45) Date of Patent: May 2, 2017

(54) POSITION MEASUREMENT SYSTEM FOR GEOSTATIONARY ARTIFICIAL SATELLITE

(75) Inventors: Eiji Sato, Tokyo (JP); Yasuhide Ichie, Tokyo (JP); Hiroaki Nagai, Tokyo (JP)

(73) Assignee: SKY Perfect JSAT Corporation, Tokyo (JP)

( * ) Notice: Subject to any disclaimer, the term of this patent is extended or adjusted under 35 U.S.C. 154(b) by 1108 days.

(21) Appl. No.: 13/636,111

(22) PCT Filed: Mar. 19, 2010

(86) PCT No.: PCT/JP2010/054882
§ 371 (c)(1),
(2), (4) Date: Sep. 19, 2012

(87) PCT Pub. No.: WO2011/114531
PCT Pub. Date: Sep. 22, 2011

(65) Prior Publication Data
US 2013/0009812 A1  Jan. 10, 2013

(51) Int. Cl.
*G01S 5/06* (2006.01)
*G01S 5/12* (2006.01)
(Continued)

(52) U.S. Cl.
CPC ............... *G01S 5/06* (2013.01); *B64G 1/242* (2013.01); *B64G 1/36* (2013.01); *B64G 3/00* (2013.01); *G01S 5/14* (2013.01); *G01S 5/12* (2013.01)

(58) Field of Classification Search
CPC ..... G01S 5/06; G01S 5/14; G01S 5/10; G01S 5/22; G01S 5/26; G01S 5/30; B64G 3/00
See application file for complete search history.

(56) References Cited

U.S. PATENT DOCUMENTS

| 4,713,768 A | 12/1987 | Kosaka et al. |
| 5,570,096 A | 10/1996 | Knight et al. |

(Continued)

FOREIGN PATENT DOCUMENTS

| EP | 1380853 A2 | 1/2004 |
| EP | 1933475 A2 | 6/2008 |

(Continued)

OTHER PUBLICATIONS

Carrier. (1999). In X. Mazda & F. Mazda, Focal Dictionary of Telecommunications, Focal Press. London, United Kingdom: Routledge. Retrieved from http://search.credoreference.com/content/entry/bhfidt/carrier/0.*

(Continued)

*Primary Examiner* — Bernarr Gregory
*Assistant Examiner* — Fred H Mull
(74) *Attorney, Agent, or Firm* — Knobbe Martens Olson & Bear LLP

(57) ABSTRACT

Ground stations 20, 21 receive any signal transmitted by a geostationary artificial satellite 10, and store the reception signal together with the reception time thereof. A difference Δt in reception time of a same signal between the ground station 20 and the ground station 21 is calculated by performing correlation processing of the reception signal of the ground station 20 and the reception signal of the ground station 21. A distance R20 between the ground station 20 and the geostationary artificial satellite 10 is measured by a distance measurement device. A distance R21 between the ground station 21 and the geostationary artificial satellite 10 is calculated on the basis of the distance R20 obtained by measurement and the difference Δt in reception times, as obtained by correlation processing.

6 Claims, 4 Drawing Sheets

(51) Int. Cl.
  *G01S 5/14* (2006.01)
  *B64G 3/00* (2006.01)
  *B64G 1/24* (2006.01)
  *B64G 1/36* (2006.01)

(56) References Cited

U.S. PATENT DOCUMENTS

| | | | |
|---|---|---|---|
| 5,614,914 | A | 3/1997 | Bolgiano et al. |
| 6,021,330 | A * | 2/2000 | Vannucci .............. H04W 64/00 342/457 |
| 6,192,217 | B1 * | 2/2001 | Farrell ............... H04B 7/18519 455/12.1 |
| 7,512,505 | B2 | 3/2009 | Harles |
| 2002/0052208 | A1 | 5/2002 | Porcino |
| 2003/0020653 | A1 | 1/2003 | Baugh et al. |
| 2004/0140930 | A1 * | 7/2004 | Harles ....................... G01S 5/14 342/387 |
| 2007/0063897 | A1 | 3/2007 | Matsuda |

FOREIGN PATENT DOCUMENTS

| | | | |
|---|---|---|---|
| EP | 2148214 | A2 | 1/2010 |
| JP | 60-173485 | | 9/1985 |
| JP | 05-232213 | | 9/1993 |
| JP | 10-509287 | | 9/1998 |
| JP | 10-319107 | | 12/1998 |
| JP | 2004510364 | | 4/2004 |
| JP | 2004526167 | | 8/2004 |
| JP | 2004534212 | | 11/2004 |
| JP | 2007256004 | | 10/2007 |
| KR | 2005038992 | A * | 4/2005 |
| WO | WO 2005012939 | | 2/2005 |

OTHER PUBLICATIONS

Carrier signal. (2001). In F. Hargrave, Hargrave's Communications Dictionary, Wiley. Hoboken, NJ: Wiley. Retrieved from http://search.credoreference.com/content/entry/hargravecomms/carrier_signal/0.*
Frequency band. (1999). Newnes Dictionary of electronics, Oxford, United Kingdom: Elsevier Science & Technology. Retrieved from http://search.credoreference.com/content/entry/bhelec/frequency_band/0.*
Storage device. (2011). The American Heritage Dictionary of the English Language. Boston, MA: Houghton Mifflin. Retrieved from http://search.credoreference.com/content/entry/hmdictenglang/storage_device/0.*
Computing device. (2015). In the Hutchinson Unabridged Encyclopedia with Atlas and Aeather Guide. Abington, United Kingdom: Helicon. Retrieved from http://search.credoreference.com/content/entry/heliconhe/computing_device/0.*
Credo Reference, search result for "clock calibration device", http://search.credoreference.com, Apr. 2016.*
Credo Reference, search result for "distance measurement device", http://search.credoreference.com, Apr. 2016.*
European Search Report dated May 15, 2014 for European Application No. 10847942.9.
International Search Report for PCT/JP2010/054882 dated Apr. 20, 2010.
International Preliminary Report on Patentability dated Nov. 22, 2012; International Application No. PCT/JP2010/054882, filed Mar. 19, 2010.

* cited by examiner

POSITION MEASUREMENT SYSTEM FOR GEOSTATIONARY ARTIFICIAL SATELLITE

TECHNICAL FIELD

The present invention relates to a technology for measuring the position of a geostationary artificial satellite that orbits in outer space.

BACKGROUND ART

Geostationary artificial satellites (hereafter, also simply "satellites") are used in services such as satellite broadcasting and satellite communications. Geostationary artificial satellites circle the earth along a predetermined geostationary orbit that has the same period as that of the earth's rotation. Viewed from the ground, thus, a geostationary artificial satellite appears to stand at the same elevation and azimuth at all times. In actuality, the position of the satellite deviates slightly from the geostationary orbit as a result of forces such as the gravitational pull of the sun/moon/earth, solar radiation pressure and the like that act on the satellite. During operation of the geostationary artificial satellite, therefore, it is necessary to correct periodically deviations from orbit. Specifically, the distance from the ground to the satellite is measured, to determine thereby the position of the satellite (this is referred to as "ranging"), and the position and attitude of the satellite are adjusted then through jet firing as needed. High-precision ranging is required in order to carry out such orbit control accurately and efficiently.

Various ranging methods have been proposed. One such known method (referred to as "one-station ranging") involves measuring the distance from one ground station (antenna) to the satellite, as well as the elevation and azimuth. However, the distance from the ground station to the satellite is very large, and hence small angle errors exert a significant influence on position measurement precision within a plane that is perpendicular to the line that joins the ground station and the satellite. Accordingly, a problem arose in that, in order to achieve a practicable degree of precision with one-station ranging, substantial equipment costs are incurred on account of the need for an antenna that has a large diameter (for instance, about 5 m for radio waves in a 12 GHz frequency band) and that is equipped with a high-precision angle control mechanism.

Patent Literature 1 discloses a ranging method that utilizes a plurality of ground stations. This document, paragraph 0028; FIG. 5, discloses a method that involves arranging one transmission station and a plurality of reception stations, causing an uplink reference signal (time stamp) from the transmission station to be returned by the satellite, and measuring the time that elapses until the signal is received by each reception station, to pinpoint thereby the position of the satellite, in accordance with the principles of trigonometric or quadrilateral surveying. This document also discloses the feature of using a GPS (Global Positioning System) satellite for synchronization of times between reception stations. The method of Patent Literature 1 can be expected to afford better precision than one-station ranging, but has a drawback in that part of a transponder, which is to be used for a service, such a broadcasting or communications, must be utilized on account of a reference signal for ranging. Also, some equipment for uplink is required in order to transmit, to the satellite, the reference signal for ranging. In the case of a satellite (for instance, a spare satellite) for which the transponder that corresponds to the frequency band for ranging is not in use, moreover, a problem arises in that re-transmission of the reference signal is not possible, and ranging itself cannot be carried out.

CITATION LIST

Patent Literature

Patent Literature 1: Japanese Translation of PCT Application No. 2004-534212

SUMMARY OF INVENTION

Technical Problem

In view of the foregoing, it is an object of the present invention to provide a technology that enables high-precision ranging of a geostationary artificial satellite, using comparatively simple equipment, and without occupying a transponder band for the purpose of ranging.

Solution to Problem

In order to attain the above goal, the present invention adopts the below-described configuration. Specifically, the position measurement system for a geostationary artificial satellite according to the present invention includes: two or more antennas including at least a first antenna and a second antenna that receive, at mutually dissimilar locations, any signal transmitted by a geostationary artificial satellite; storage means for storing a reception signal received by each antenna, together with a reception time of the reception signal; correlation processing means for calculating a difference in reception time of a same signal between the first antenna and the second antenna, by performing correlation processing on the reception signal of the first antenna and the reception signal of the second antenna which have been stored in the storage means; measurement means for measuring a distance between the first antenna and the geostationary artificial satellite; and calculation means for calculating a distance between the second antenna and the geostationary artificial satellite on the basis of the distance between the first antenna and the geostationary artificial satellite as obtained by the measurement means, and the difference in reception time between the first antenna and the second antenna as obtained by the correlation processing means.

Herein, "same signal" denotes a "signal transmitted at the same point in time by the geostationary artificial satellite". Therefore, the feature "difference in reception time of a same signal between the first antenna and the second antenna" can be expressed as "difference in the time that it takes for a signal that is transmitted, at a same point in time, by the geostationary artificial satellite, to reach the first antenna, and the time that it takes for the signal to reach the second antenna". Alternatively, the feature can be also expressed as "delay time between arrival of a signal that is transmitted, at a same point in time, by the geostationary artificial satellite, to a first (or second antenna), and arrival to a second (or first antenna)". In the case of three or more antennas, the difference between the reception times of the first antenna and the N-th antenna (N≥3), and the distance between the N-th antenna and the geostationary artificial satellite can be calculated through the same processing as in the case of the second antenna.

In the configuration of the present invention, any signals transmitted by the geostationary artificial satellite can be used for calculating the differences in reception times between antennas, by correlation processing. Accordingly, there is no need to use part of a transponder on account of a reference signal for ranging, as in conventional instances, and no uplink of the reference signal to the geostationary artificial satellite is required. As the antennas that are utilized in the present invention it is sufficient to use antennas that can receive radio waves from a geostationary artificial satellite, and hence for instance, commercial antennas having a diameter from about 50 cm to 120 cm can be used if using radio waves in a 12 GHz frequency band. Therefore, a significant cost reduction is afforded as compared with conventional systems that require large-diameter antennas and uplink equipment. Moreover, installation of antenna equipment is extremely easy.

As a characterizing feature of the present invention, the distance between a first antenna that serves as a reference and a geostationary artificial satellite (hereafter, "reference distance") is worked out through measurement, and the distance between the other antenna and the geostationary artificial satellite is calculated as a relative value with respect to the above-described reference distance, on the basis of the difference in reception time with respect to the first antenna. By obtaining thus the reference distance by measurement, it becomes possible to calculate the distance between the antenna and the geostationary artificial satellite with good precision. As a result, the three-dimensional orbit position of the geostationary artificial satellite can be worked out, with sufficient precision, even if the arrangement distance between the first antenna and the other antenna is not that large. Reducing the arranging distance between antennas is particularly advantageous in countries of small land area, such as Japan and other Asian countries.

The above configuration, preferably, further has clock calibration means for automatically calibrating clocks that count the reception times of the respective antennas, on the basis of a same reference time system.

Herein, "same reference time system" indicates that there can be used, for instance, time information transmitted by a GPS satellite, or time information from standard radio waves (In the case of Japan, Japan Standard Time transmitted by JJY). As a result, the times of a plurality of ground stations at remote locations can be substantially matched to each other, and hence reception time differences can be calculated with good precision.

As described above, any signal that is transmitted by the geostationary artificial satellite can be used in the present invention. Herein, carrier signals that are used in satellite broadcasting services or satellite communications services are suitable for use in correlation processing, since doing so can be expected to result in enhanced precision of the correlation processing. Practicable precision can be obtained, even with correlation processing with short term signals. Therefore, a small and inexpensive frequency standard generator, for instance of rubidium or quartz, can be used, which is advantageous. Alternatively, a telemetry signal of the geostationary artificial satellite can be appropriately used for correlation processing. That is because a telemetry signal is emitted usually by all types of geostationary artificial satellites, and hence the ranging scheme of the present invention can be used regardless of the state of the geostationary artificial satellite.

The present invention can be viewed as a "position measurement system for geostationary artificial satellites" (or "position measurement device" or "ranging system") that includes at least some of the abovementioned features, or can be viewed as a "position measurement method for geostationary artificial satellites" (or "ranging method") that involves at least part of the above-described processing. Further, the present invention can be viewed as a program for executing, in a computer, at least part of the above-described processing, or as a computer-readable medium in which such a program is recorded.

Advantageous Effects of Invention

The present invention enables high-precision ranging of a geostationary artificial satellite, using comparatively simple equipment, and without occupying a transponder band for the purpose of ranging.

DESCRIPTION OF EMBODIMENTS

The position measurement system according to an embodiment of the present invention will be explained next in more detail with reference to accompanying drawings. The position measurement system is a system for ranging of geostationary artificial satellites that are used in, for instance, satellite broadcasting, satellite communications, meteorological observation or the like, and is used, for instance, for monitoring and prediction of satellite orbits, and for orbit control, in control centers of geostationary artificial satellites.

(Ranging Method Overview)

Figure 1:
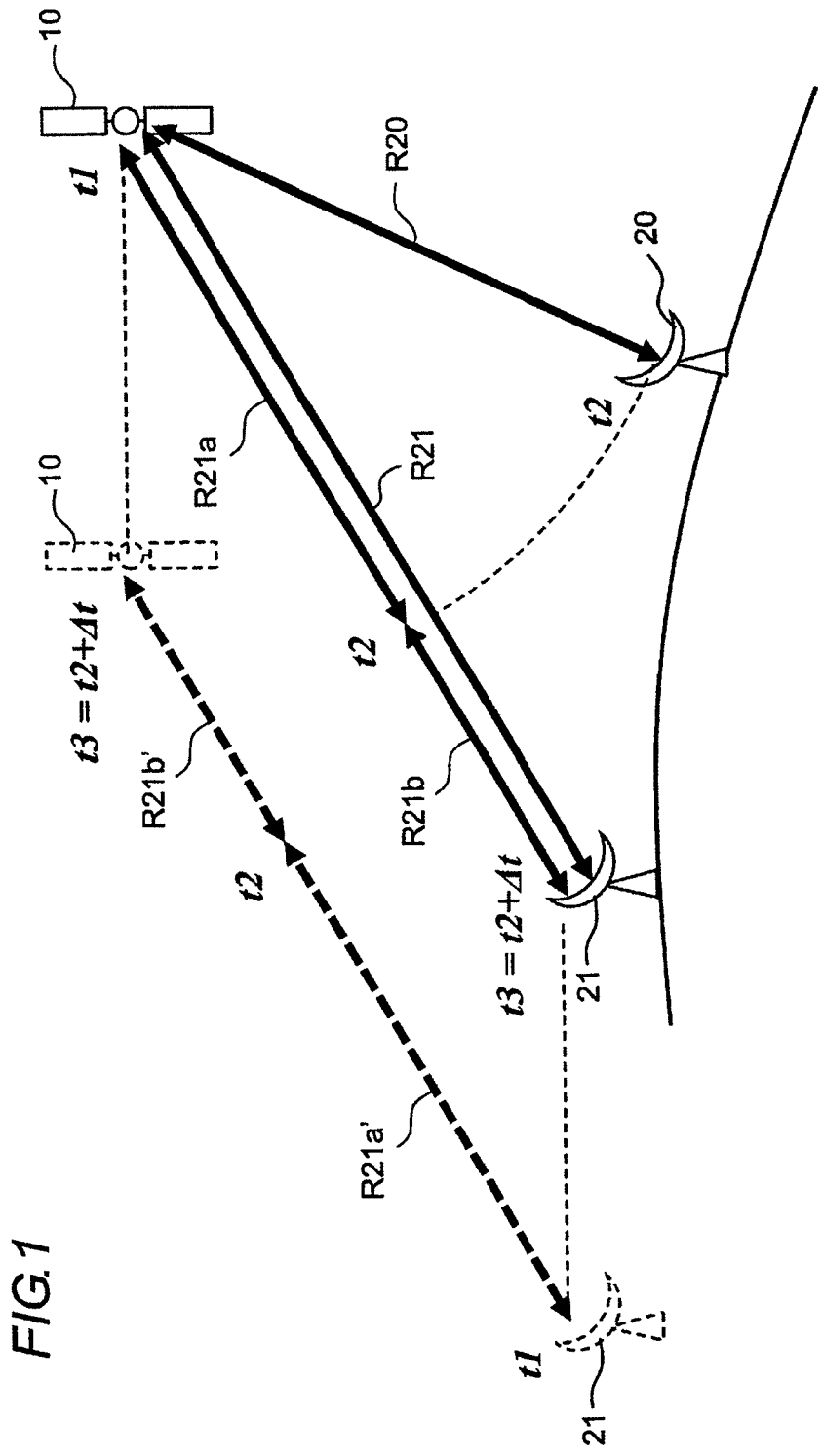
[FIG. 1] A diagram for explaining an overview of a ranging method in a position measurement system according to an embodiment of the present invention

An overview of the ranging method of the present system will be explained first with reference to FIG. 1. The present system is provided with a plurality of ground stations that are disposed on dissimilar locations of the earth's surface. FIG. 1 illustrates an example of two ground stations 20, 21, but three or more ground stations can likewise be used.

In one ground station 20 that serves as a reference, from among the ground stations, there is provided a distance measurement device that measures a distance R20 between the ground station 20 and a geostationary artificial satellite 10. As the distance measurement device there can be used, for instance, a device that measures a round-trip time of radio waves between the ground station and the geostationary artificial satellite, using a transmitting and receiving antenna, and that calculates the distance on the basis of the round-trip time and the propagation speed of the radio waves. Devices of such type are costly and involve comparatively large-scale facilities. Therefore, it is impractical to arrange a distance measurement device in all the ground stations that are provided for the purpose of ranging. In the present system, accordingly, the distance measurement device is disposed only at the reference ground station 20; in the other ground stations 21, the distance up to the geostationary artificial satellite 10 is calculated on the basis of a relative relationship with the reference ground station 20 in the manner described below.

Any signal (radio waves) transmitted by the geostationary artificial satellite 10 is received by the ground stations 20, 21. Ordinarily, a distance R21 from the geostationary artificial satellite 10 to the ground station 21 is different from the distance R20 from the geostationary artificial satellite 10 to the ground station 20. Therefore, a time difference Δt arises between time t2, at which a signal transmitted by the geostationary artificial satellite 10 at time t1 reaches the ground station 20, and time t3, at which the same signal reaches the ground station 21. In the present system, the difference Δt of the reception time of a same signal between the ground station 20 and the ground station 21 is worked out through correlation processing of the reception signal received by the ground station 20 and the reception signal received by the ground station 21.

The distance R21 between the ground station 21 and the geostationary artificial satellite 10 can be regarded as the sum total of a distance R21a over which the radio waves propagate between times t1 to t2, and a distance R21b over which the radio waves propagate during Δt. The distance R21a cannot be worked out directly, since time t1 is unknown. However, the distance R21a can be approximated by the distance R20 from the geostationary artificial satellite 10 to the ground station 20. Therefore, the distance R21 between the ground station 21 and the geostationary artificial satellite 10 can be calculated if the actually measured distance R20 from the ground station 20 to the geostationary artificial satellite 10 and the difference Δt of reception times between the ground station 20 and the ground station 21 are known.

In an actual calculation, preferably, a portion R21a' on the side near the ground station 21, from within the distance R21 between the ground station 21 and the geostationary artificial satellite 10, is approximated by the actually measured distance R20 from the ground station 20 to the geostationary artificial satellite 10, as denoted by the dotted line of FIG. 1, and the portion R21b' near the geostationary artificial satellite 10 on the side near the geostationary artificial satellite 10 is calculated on the basis of Δt. That is, the distance R21 can be calculated based on the expression below, using the speed of light c in vacuum.

$$R21 = R20 + c_x \Delta t$$

The propagation speed of radio waves varies between the vicinity of the geostationary artificial satellite (in vacuum) and the vicinity of the ground surface. However, such propagation speed variation is already worked into the value actually measured distance R20. In consequence, the calculation of the distance R21 allows working out the distance R21 according to a simple calculation that takes into account variations of propagation speed in the vicinity of the ground surface, by approximating the portion R21a', on the near side to the ground station 21, by the actually measured distance R20.

The distances R20, R21 from the ground stations 20, 21 to the geostationary artificial satellite 10 are worked out in accordance with the abovementioned method. The orbit of the geostationary artificial satellite can be worked out with good precision upon repeated measurement of the distances R20, R21 for a plurality of points in time, by combining a statistical method, such as least squares, for the measured data points, with orbit generation of the geostationary artificial satellite in a data acquisition period according to a model of, for instance, how gravity from the sun and moon act on the geostationary artificial satellite.

Any signals that are transmitted by the geostationary artificial satellite 10 can be used for ranging in the present system. Specifically, there can be used the signal of a carrier that is used for satellite broadcasting services or satellite communications services (hereafter also referred to as "user carrier"), or a telemetry signal (signal periodically emitted by the geostationary artificial satellite in order to notify conditions such as temperature, current, attitude and so forth). A user carrier signal is preferably used from the viewpoint of precision in correlation processing. A user carrier, which is a broad band, conveys a variety of information items, and hence forms ordinarily complex signal waveforms that are very unlikely to be repeated in a similar waveform at another point in time. As a result, output of erroneous results in correlation processing can be reduced to the utmost, and practicable precision can be achieved, even with correlation processing using short term signals. On the other hand, using a telemetry signal has also some advantages, since there are geostationary artificial satellites (for instance, spare satellites) that are not transmitting any user carrier signal. Telemetry signals can be ordinarily received from any geostationary artificial satellite, and hence the ranging scheme of the present system can be used regardless of the state of the geostationary artificial satellite.

(Device Configuration)

Figure 2:
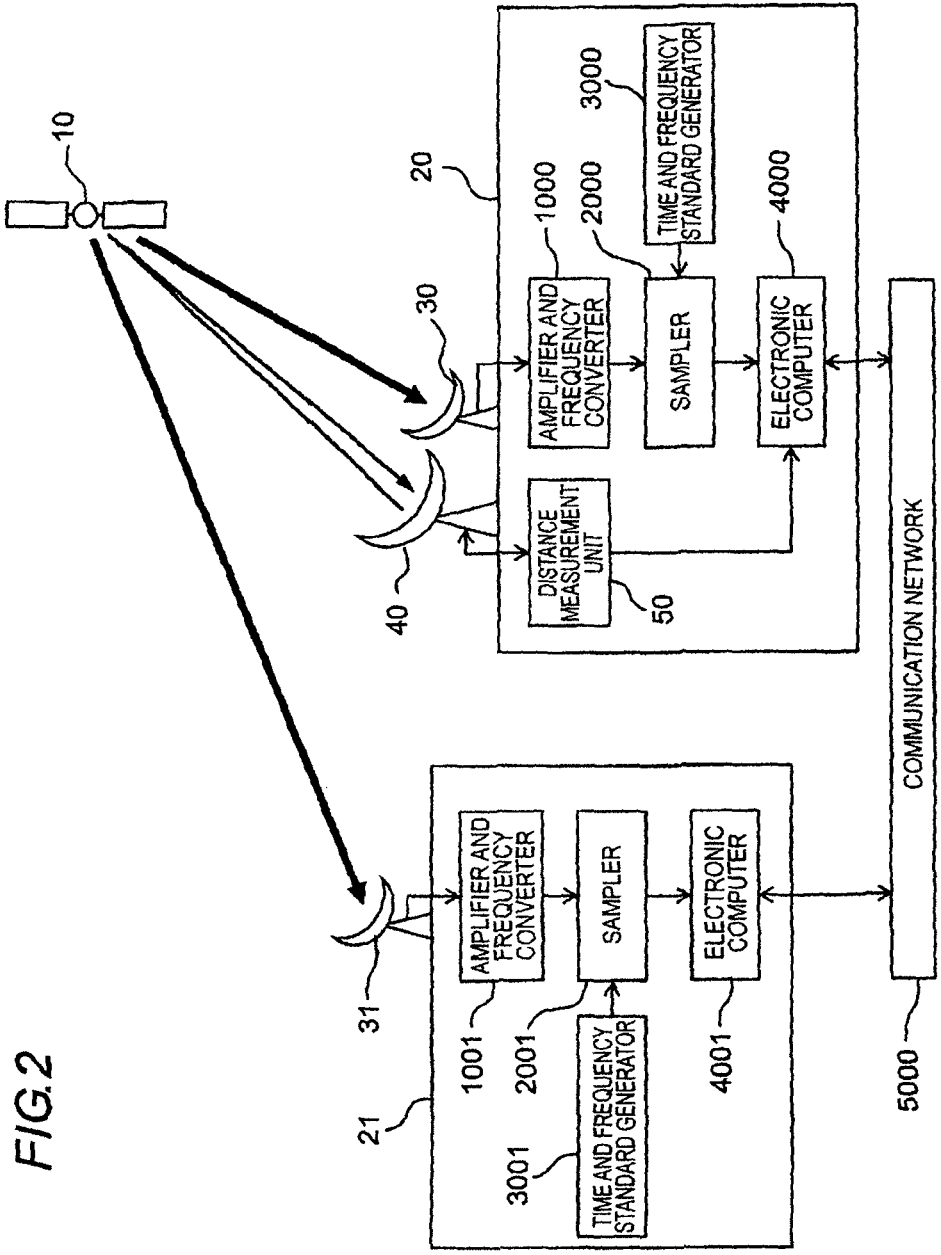
[FIG. 2] A diagram illustrating a device configuration of a position measurement system according to an embodiment of the present invention

A specific configuration example of the position measurement system will be explained next with reference to FIG. 2.

The position measurement system comprises the two ground stations 20, 21. The first ground station 20, as the reference station, is provided with a first antenna for reception 30, an amplifier and frequency converter 1000, a sampler 2000, a time and frequency standard generator 3000, and an electronic computer 4000. Similarly, the second ground station 21 is provided with a second antenna for reception 31, an amplifier and frequency converter 1001, a sampler 2001, a time and frequency standard generator 3001 and an electronic computer 4001. The first ground station 20 is provided with an antenna 40 and a distance measurement unit 50, as a distance measurement device (measurement means) for measuring the distance (reference distance) from the first antenna 30 to the geostationary artificial satellite 10.

The first antenna 30 is a device for receiving radio waves that are transmitted by the geostationary artificial satellite 10. A satellite broadcasting reception antenna for commercial use can be used as the first antenna 30. In a case where a wideband signal, such as a user carrier, is used in an example of radio waves of a 12 GHz frequency band, then sufficient precision can be achieved with antennas having a diameter from about 50 cm to 100 cm. If narrow-band signals, for instance telemetry signals, are used, then it is preferable to use a slightly larger antenna, having a diameter of about 120 cm, from the viewpoint of enhancing the SN ratio. The signal received by the first antenna 30 is inputted to the amplifier and frequency converter 1000 via a coaxial cable.

The amplifier and frequency converter 1000 is a device that amplifies the reception signal inputted from the first antenna 30 and converts the frequency of the signal to a video band. The output of the amplifier and frequency converter 1000 is inputted to the sampler 2000.

The time and frequency standard generator 3000 is a device that receives time information transmitted by a GPS satellite, and that, synchronously therewith, outputs a frequency standard signal and a 1-PPS (pulse per second) signal. The 1-PPS signal is a pulse-like signal that is outputted every second in synchrony with GPS time. The frequency standard signal is a signal of predetermined frequency (for instance, 10 MHz) that is generated using the 1-PPS signal as a reference. In the present embodiment, the frequency standard signal is obtained by calibrating the frequency outputted by an oscillator, for instance of quartz or rubidium, using the 1-PPS signal as a reference. The frequency standard signal and the 1-PPS signal are inputted to the sampler 2000, via a cable, and are referred to as a reference signal for determining a reception time that is given to the reception signal data. The other ground station 21 is also provided with the time and frequency standard generator 3001 of identical configuration. The time and frequency standard generators function as a clock calibration means for automatic calibration of the clocks of the ground stations 20, 21 on the basis of the GPS time system. In a case where the output of the oscillator, for instance of quartz or rubidium is used, as-is, as the frequency standard, without clock calibration means such as the above-described being provided, then the times at the ground stations shift gradually, and hence a problem arises in that the calculation error of the reception time difference $\Delta t$ grows gradually. By contrast, in a case of ongoing clock calibration on the basis of a common reference time system, as in the present embodiment, the clocks of the plurality of ground stations at remote locations can be substantially synchronized (in a strict sense, the relative offset of times is kept within a given range). As a result, the reception time difference $\Delta t$ can be calculated with good precision over long periods of time.

The sampler 2000 is a circuit that has the function of sampling the analog signal that is inputted from the amplifier and frequency converter 1000, converting the analog signal to digital data, and applying reception time information to the data. The times given by the sampler 2000 are set by using, as a reference, the 1-PPS signal and frequency standard signal that are given by the time and frequency standard generator 3000.

The electronic computer 4000 has a function of saving, in a storage device, data that is outputted by the sampler 2000 (reception signal to which the reception time has been given), a function of exchanging data with the electronic computer 4001 of the other ground station 21, via the communication network 5000, a function of calculating the reception time difference $\Delta t$ through correlation processing among reception signals, and a function of calculating the distance R21 between the ground station 21 and the geostationary artificial satellite 10, on the basis of $\Delta t$. The electronic computer 4000 can be configured in the form of a general-purpose personal computer that is provided with, for instance, a CPU (central processing unit), a main storage device (for instance, a RAM), an auxiliary storage device (for instance, a hard disk), and a communications I/F. An input device (for instance, a keyboard or a mouse), a display device and the like may also be provided, as the case may require. The above-described functions are realized through execution, by the CPU, of a program that is stored in the auxiliary storage device and that is then loaded to the main storage device.

The distance measurement device, which is measurement means for measuring the distance between the first antenna 30 and the geostationary artificial satellite 10, is made up of the antenna 40 and the distance measurement unit 50. For measurement, the distance measurement unit 50 generates a predetermined transmission signal, the signal is transmitted by the antenna 40 to the geostationary artificial satellite 10, is returned by the geostationary artificial satellite 10, and is received by the antenna 40. Instead of a transponder band, for instance a band of telemetry or the like that is secured in order to control the satellite is used for return of the signal in the geostationary artificial satellite. The distance measurement unit 50 measures the round-trip time of radio waves between the antenna 40 and the geostationary artificial satellite 10, and calculates the distance between the antenna 40 and the geostationary artificial satellite 10 on the basis of the round-trip time and the propagation speed of the radio waves. In a case where the first antenna 30 and the antenna 40 are very close to each other, the distance between the antenna 40 and the geostationary artificial satellite 10 can be regarded as the distance between the first antenna 30 and the geostationary artificial satellite 10. Alternatively, in the case of a non-negligible difference $\Delta R$ of the distance between the antenna 40 and the geostationary artificial satellite 10 and the distance between the first antenna 30 and the geostationary artificial satellite 10, then $\Delta R$ may be calculated beforehand on the basis of the positional relationship between the antenna 40 and the first antenna 30, whereupon $\Delta R$ is added to, or subtracted from, the distance between the antenna 40 and the geostationary artificial satellite 10, to work out thereby the distance between the first antenna 30 and the geostationary artificial satellite 10. The calculation result of the distance measurement unit 50 is inputted to the electronic computer 4000.

If there is already existing equipment for one-station ranging, then that equipment can be used as the above-described distance measurement device. The introduction costs of the present system can be significantly reduced as a result. The antenna 40 can then also function as the first antenna 30. In such a case, the distance between the first antenna 30 and the geostationary artificial satellite 10 can be measured directly.

The configuration and function of the second ground station 21 are identical to those of the first ground station 20, and an explanation thereof will hence be omitted.

(Ranging Processing)

Figure 3:
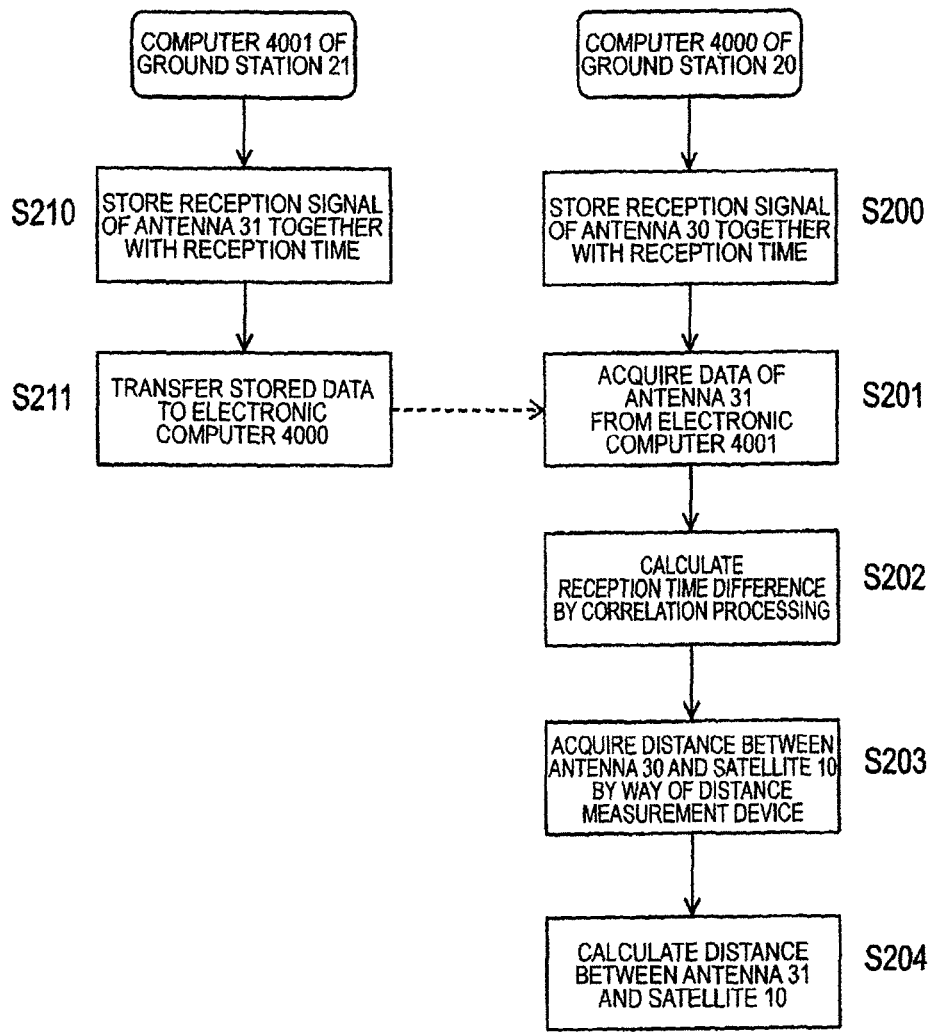
[FIG. 3] A flowchart illustrating the flow of ranging processing
Figure 4:
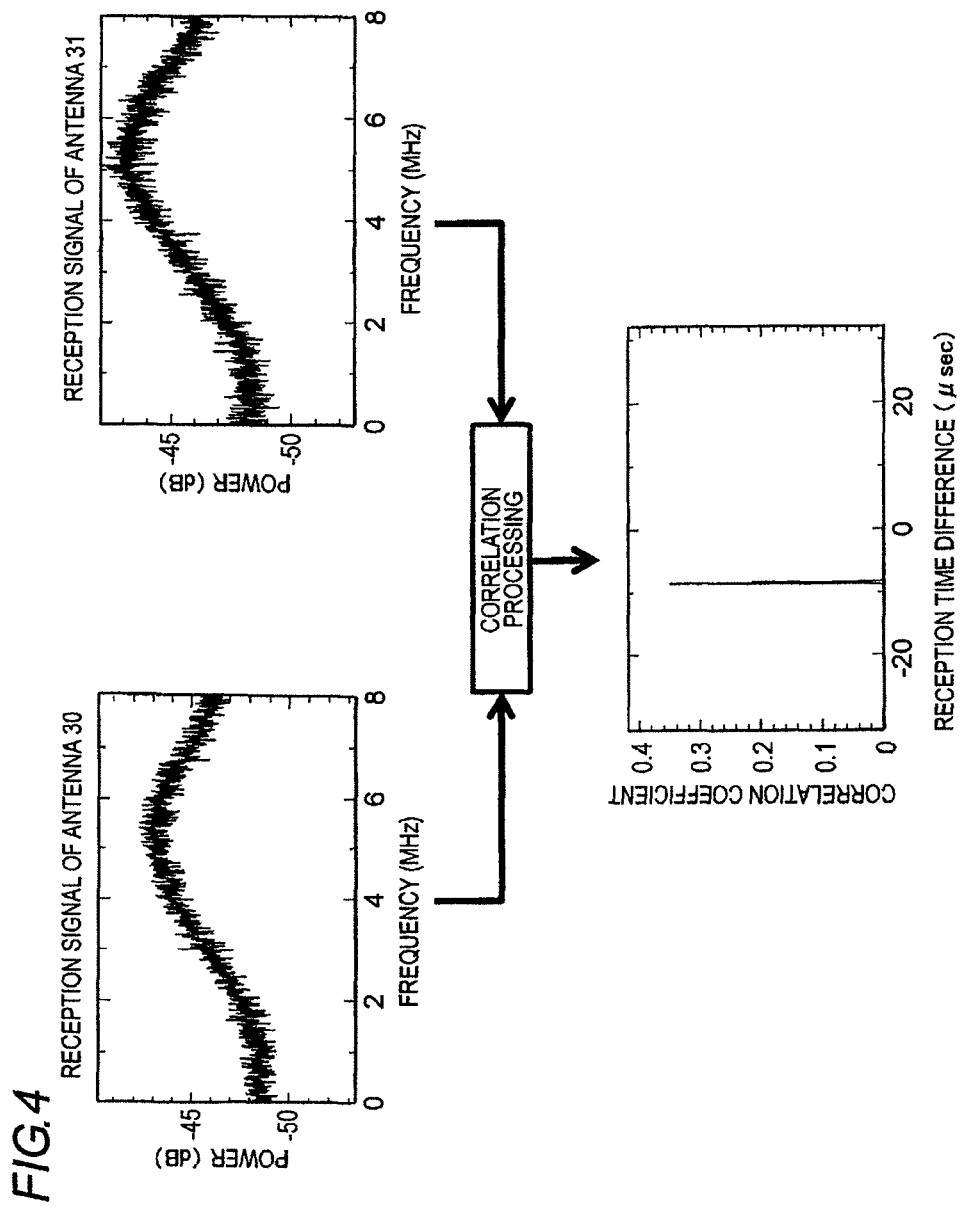
[FIG. 4] A diagram for explaining reception signals that are used for ranging, and an exemplary result of correlation processing

An explanation follows next, with reference to FIG. 3 and FIG. 4, on the flow of ranging processing and on a calculation example of ranging in the position measurement system. FIG. 3 is a flowchart that illustrates the ranging processing flow, and FIG. 4 is a diagram for explaining reception signals that are used for ranging, and the exemplary result of correlation processing.

As illustrated in FIG. 3, reception signal data and reception times are stored in the electronic computers 4000, 4001 of the respective ground stations 20, 21 (S200, S210). Preferably, the waveform of the signal transmitted by the geostationary artificial satellite 10 at a same point in time includes at least both data items, and there is acquired data of sufficient length to enable discrimination from a signal waveform that is transmitted at another point in time. Acquisition of the reception signal for about 2 seconds is sufficient, assuming that there is used a signal of a user carrier that is utilized for satellite broadcasting.

Next, the electronic computer 4001 of the ground station 21 forwards the data of the reception signal of the antenna 31 to the electronic computer 4000 of the ground station 20, via the communication network 5000 (S211, S201). The electronic computer 4000 executes correlation processing of the reception signal of the antenna 30 and the reception signal of the antenna 31 (S202). Any known method may be used for correlation processing, and hence a detailed explanation thereof will be omitted. An example of frequency spectra of the reception signals of the antenna 30 and the antenna 31 is depicted at the top of FIG. 4. The result of correlation processing performed on the two signals is depicted at the bottom of FIG. 4. In this example, the result yields a reception time difference of about −8.5 µsec.

Next, the electronic computer 4000 acquires a measured value of the distance between the antenna 30 and the geostationary artificial satellite 10, from the distance measurement unit 50 (S203). Herein it is preferable to use a measured value that is measured at the same point in time as that of the reception signal that is used in the correlation processing of S202. However, if the distance is to be actually measured at the same point in time, then the operation of the distance measurement unit 50 must be synchronized with correlation processing, which accordingly entails a more complex system configuration. In the present embodiment, therefore, the distance is measured, by the distance measurement unit 50, a plurality of times at predetermined time intervals, and the measured values are interpolated, to work out thereby the distance at the same times as in of correlation processing. As a result, high-precision distance information can be obtained by relying on a simple configuration. Interpolation processing may be performed for the distance R20 between the antenna 30 and the geostationary artificial satellite 10 (FIG. 1), for the distance R21*b*, or for both the distance R20 and R21*b*.

The electronic computer 4000 calculates the distance between the antenna 31 and the geostationary artificial satellite 10 by using the reception time difference worked out in the correlation processing of S202 and the measured values obtained in S203 (S204). A specific calculation example of S204 will be explained in detail next.

(Calculation Example)

The 1-PPS output of the time and frequency standard generator is delayed by $\Delta$Tgps_rcvr with respect to Coordinated Universal Time (UTC), and the 1-PPS signal outputted by the time and frequency standard generator takes a time $\Delta$T1pps_cable_delay to propagate through the cable and to be inputted to the sampler. Thus, in a case where the times in the sampler are set taking the 1-PPS signal as reference, the times held in the sampler are delayed with respect to UTC by:

$$\Delta Tclock\_delay = \Delta Tgps\_rcvr + \Delta T1pps\_cable\_delay.$$

Taking $\Delta$Tclock_delay_x as the delay of the times held in the sampler 2000 of the ground station 20 (X station) with respect to UTC, and $\Delta$Tclock_delay_y as the delay of the times held in the sampler 2001 of the ground station 21 (Y station) with respect to UTC, then the clock of the Y station is delayed by $\Delta$Tclock with respect to the X station, as follows:

$$\Delta Tclock = \Delta Tclock\_delay\_y - \Delta Tclock\_delay\_x \quad \text{(Expression 1)}.$$

Herein, Trng_x is the time required for propagation from the geostationary artificial satellite 10 up to the X station antenna 30, Rrng_x is the corresponding distance, and $\Delta$TRF_delay_x is the propagation delay from the X station antenna 30 up to the sampler 2000. Similarly, Trng_y is the time required for propagation from the geostationary artificial satellite 10 up to the Y station antenna 31, Rrng_y is the corresponding distance, and $\Delta$TRF_delay_y is the propagation delay from the Y station antenna 31 up to the sampler 2001. Further, Rtcr_x is the distance from the geostationary artificial satellite 10 to the antenna 40 as actually measured by the distance measurement device, the X station antenna 30 being farther from the geostationary artificial satellite 10, by $\Delta$Rant_pos_x, than the antenna 40.

Such being the case, a reception time difference Tobs as calculated through correlation processing is the time difference of the points in time at which the radio waves from the geostationary artificial satellite 10 are recorded in the samplers 2000, 2001, and is given by the expression below.

$$Tobs = (Trng\_y + \Delta TRF\_delay\_y + \Delta Tclock) - (Trng\_x + \Delta TRF\_delay\_x) \quad \text{(Expression 2)}$$

The following relationship holds between the distance from the geostationary artificial satellite 10 to the X station antenna 30 and the distance from the geostationary artificial satellite 10 to the antenna 40.

$$Rrng\_x = Rtcr\_x + \Delta Rant\_pos\_x \quad \text{(Expression 3)}$$

Based on Expression 2, Trng_y is given by the expression below:

$$Trng\_y = Trng\_x + Tobs - \Delta Tclock - (\Delta TRF\_delay\_y - \Delta TRF\_delay\_x) \quad \text{(Expression 4)}.$$

If both sides of Expression 4 are multiplied by the speed of light c, the following can be obtained:

$$c \cdot Trng\_y = c \cdot Trng\_x + c \cdot \{Tobs - \Delta Tclock - (\Delta TRF\_delay\_y - \Delta TRF\_delay\_x)\} \quad \text{(Expression 5)}.$$

Since Rrng_x=c.Trng_x and Rrng_y=c.Trng_y, Expression 5 can be rewritten as follows:

$$Rrng\_y = Rrng\_x + c \cdot \{Tobs - \Delta Tclock - (\Delta TRF\_delay\_y - \Delta TRF\_delay\_x)\} \quad \text{(Expression 6)}.$$

Substituting Expression 3, the following can be obtained:

$$Rrng\_y = Rtcr\_x + \Delta Rant\_pos\_x + c \cdot \{Tobs - \Delta Tclock - (\Delta TRF\_delay\_y - \Delta TRF\_delay\_x)\} \quad \text{(Expression 7)}.$$

The electronic computer 4000 calculates the distance Rrng_y from the Y station antenna 31 to the geostationary artificial satellite 10 by substituting, into Expression 7, the reception time difference Tobs worked out in the correlation processing of S202 and the distance measured value Rtcr_x+$\Delta$Rant_pos_x obtained in S203. In Expression 7, $\Delta$Rant_pos_x can be calculated by surveying the positions at which the antenna 30 and the antenna 40 are disposed, $\Delta$Tclock can be calculated on the basis of the delay time by cable actual measurement and on the basis of the specifications of the time and frequency standard generator, and $\Delta$TRF_delay_y and $\Delta$TRF_delay_x can be obtained by actual measurement or on the basis of the length of the propagation path and the propagation delay time per unit length. Therefore, the values of these parameters may be calculated or measured beforehand, and may be saved in a storage device of the electronic computer 4000 or the distance measurement device.

The information required for estimating the orbit of the geostationary artificial satellite 10 can be gathered by repeating, at the necessary time intervals, the processing of calculating the distances Rrng_x and Rrng_y from the ground stations 20, 21 to the geostationary artificial satellite 10.

A summary of the advantages of the present system follows next.

In the configuration of the present system, any signals transmitted by the geostationary artificial satellite 10 can be used for calculating, by correlation processing, the differences in reception times between antennas. Accordingly, there is no need to use part of a transponder on account of a reference signal for ranging, as in conventional instances. As the antennas 30, 31 that are utilized in the present system it suffices to use antennas that can receive radio waves from the geostationary artificial satellite 10. For instance, commercial antennas having a diameter from about 50 cm to 120 cm can therefore be used herein. Accordingly, a significant cost reduction is afforded as compared with conventional systems that require large-diameter antennas and uplink equipment. Moreover, installation of antenna equipment is extremely easy.

As a characterizing feature of the present system, the distance between the antenna 30 that serves as a reference and the geostationary artificial satellite 10 (reference distance) is worked out through measurement, and the distance between the other antenna 31 and the geostationary artificial satellite 10 is calculated as a relative value with respect to the above-described reference distance, on the basis of the difference in reception time with the antenna 30. The distance between the antenna 31 and the geostationary artificial satellite 10 can be calculated with good precision by obtaining thus the reference distance by measurement. As a result, the three-dimensional orbit position of the geostationary artificial satellite 10 can be worked out, with sufficient precision, even if the arrangement distance between the antenna 30 and the antenna 31 is not that large. Reducing the arranging distance between antennas is particularly advantageous in countries of small land area, such as Japan and other Asian countries.

Also, VLBI systems are used wherein signals emitted by spacecraft are received by two or more stations, and reception time delay is measured by correlation processing. However, the signals handled by this kind of system are narrow-band weak signals, and hence it is necessary to use signals lasting about several minutes for working out a correlation. In a case where correlation processing takes thus a long time, a high-precision frequency standard such as that of a hydrogen maser must be used in order to guarantee the precision of delay time measurement. Large-scale and expensive equipment is thus required. In the above-described embodiment, by contrast, the correlation processing time can be made extremely short (about 2 seconds) by relying on a user carrier signal. Therefore, sufficient practical precision can be achieved even when using, as a frequency standard, a signal such that the output of an inexpensive small oscillator, for instance of rubidium, quartz or the like, is calibrated according to a common time system, such as GPS or the like.

The present invention has been explained in detail above based on an example of a specific embodiment, but the scope of the present invention is not limited to the above-described embodiment, and may accommodate various modifications that lie within the scope of the technical idea of the invention. In the above-described embodiment, for instance, the electronic computer 4000 of the ground station 20 performs correlation processing, distance calculation processing and so forth, but such processing may be performed by the electronic computer 4001 of the ground station 21, or by any electronic computer that is installed separately from the ground stations 20, 21. In the above-described embodiment, the communication network 5000 is used for transfer of data between ground stations, but data may be exchanged using a portable storage medium such as a magnetic storage medium or the like. In the above-described embodiment, an example of two ground stations has been illustrated, but three or more ground stations can be used instead. In this case as well, distance measurement is performed only by the ground station 20 that serves as a reference; for the other ground stations, the distance to the geostationary artificial satellite can be calculated using the reception time difference with respect to the reference ground station 20.

REFERENCE SIGNS

10: geostationary artificial satellite
20: first ground station (reference ground station)
21: second ground station
30: first antenna
31: second antenna
40: distance measurement device antenna
50: distance measurement unit
1000, 1001: amplifier and frequency converter
2000, 2001: sampler
3000, 3001: time and frequency standard generator
4000, 4001: electronic computer
5000: communication network

The invention claimed is:

1. A position measurement system for a geostationary artificial satellite, the system comprising:
    two or more antennas including at least a first antenna and a second antenna that receive, at mutually dissimilar locations, any signal transmitted by a geostationary artificial satellite;
    a storage device configured to store a reception signal received by each of the antennas, together with a reception time of the reception signal;
    a distance measurement device configured to measure, by using an antenna for distance measurement, a round-trip time of a radio wave transmitted between said antenna for distance measurement and said geostationary artificial satellite, and to calculate a first distance between said first antenna and said geostationary artificial satellite on the basis of the measured round-trip time, wherein said antenna for distance measurement is said first antenna or an antenna disposed close to said first antenna; and
    an electronic computer configured to calculate a difference in reception time of a same signal, transmitted at the same point in time to said first antenna and said second antenna by the geostationary artificial satellite, between said first antenna and said second antenna, by performing correlation processing on the reception signal of said first antenna and the reception signal of said second antenna which have been stored in said storage device, to calculate a second distance by multiplying the speed of light and the difference in reception time between said first antenna and said second antenna, and to calculate a distance between said second antenna and said geostationary artificial satellite by adding the first distance to the second distance,
    wherein the signal used in said correlation processing is a signal in a band which carries information of a satellite broadcasting service or a satellite communications service,
    wherein the distance measurement device is further configured to measure distances between said geostationary artificial satellite and said antenna for distance measurement a plurality of times at predetermined time intervals to generate a plurality of measured values of the first distance, wherein the electronic computer is further configured to interpolate the plurality of measured values of the first distance so as to acquire the value of the first distance at the same point in time as in the correlation processing on the reception signal of said first antenna and the reception signal of said second antenna, and
    wherein the distance between said second antenna and said geostationary artificial satellite is used to determine an orbit of said geostationary artificial satellite and carry out orbit control of said geostationary artificial satellite.

2. The position measurement system for a geostationary artificial satellite according to claim 1, further comprising:

a time and frequency standard generator configured to automatically calibrate clocks that count the reception times of the respective antennas, on the basis of a same reference time system.

3. The position measurement system for a geostationary artificial satellite according to claim 1, wherein the signal used for distance measurement is a signal in a band of telemetry that is secured in order to control said geostationary artificial satellite.

4. The position measurement system for a geostationary artificial satellite according to claim 1, wherein the position measurement system is configured to be used for at least one of the following: satellite broadcasting, satellite communications, meteorological observation, a system for monitoring and prediction of satellite orbits, an orbit control system or a control center for geostationary artificial satellites.

5. A position measurement method for a geostationary artificial satellite, the method comprising:
 receiving, at mutually dissimilar locations, any signal transmitted by a geostationary artificial satellite, by two or more antennas including at least a first antenna and a second antenna;
 storing, in a storage device, a reception signal received by each antenna, together with a reception time of the reception signal;
 measuring, at a distance measurement device, by using an antenna for distance measurement, a round-trip time of a radio wave transmitted between said antenna for distance measurement and said geostationary artificial satellite, and to calculate a first distance between said first antenna and said geostationary artificial satellite on the basis of the measured round-trip time, wherein said antenna for distance measurement is said first antenna or an antenna disposed close to said first antenna; and
 first calculating, at an electronic computer, a difference in reception time of a same signal, transmitted at the same point in time to said first antenna and said second antenna by the geostationary artificial satellite, between said first antenna and said second antenna, by performing correlation processing on the reception signal of said first antenna and the reception signal of said second antenna which have been stored in said storage device, to calculate a second distance by multiplying the speed of light and the difference in reception time between said first antenna and said second antenna; and
 second calculating, at the electronic computer, a distance between said second antenna and said geostationary artificial satellite by adding the first distance to the second distance, wherein the signal used in said first and second calculating is a signal in a band which carries information of a satellite broadcasting service or a satellite communications service,
 wherein the distance measurement device is further configured to measure distances between said geostationary artificial satellite and said antenna for distance measurement a plurality of times at predetermined time intervals to generate a plurality of measured values of the first distance, wherein the electronic computer is further configured to interpolate the plurality of measured values of the first distance so as to acquire the value of the first distance at the same point in time as in the correlation processing on the reception signal of said first antenna and the reception signal of said second antenna, and
 wherein the distance between said second antenna and said geostationary artificial satellite is used to determine an orbit of said geostationary artificial satellite and carry out orbit control of said geostationary artificial satellite.

6. The position measurement method according to claim 5, wherein the signal used for distance measurement is a signal in a band of telemetry that is secured in order to control said geostationary artificial satellite.

* * * * *